O. H. THELEEN.
VALVE OPERATING MECHANISM.
APPLICATION FILED DEC. 20, 1910.
1,066,863.
Patented July 8, 1913.
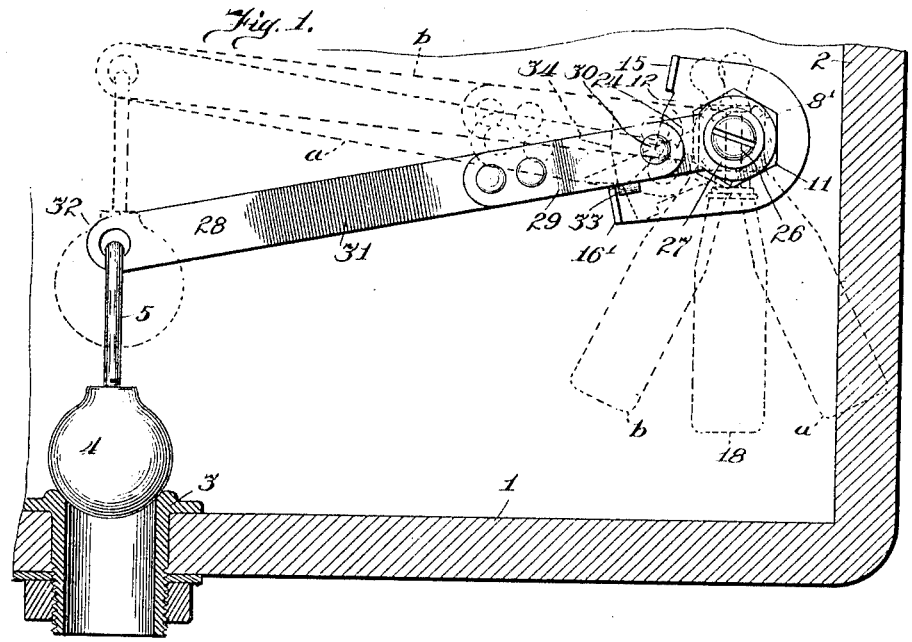
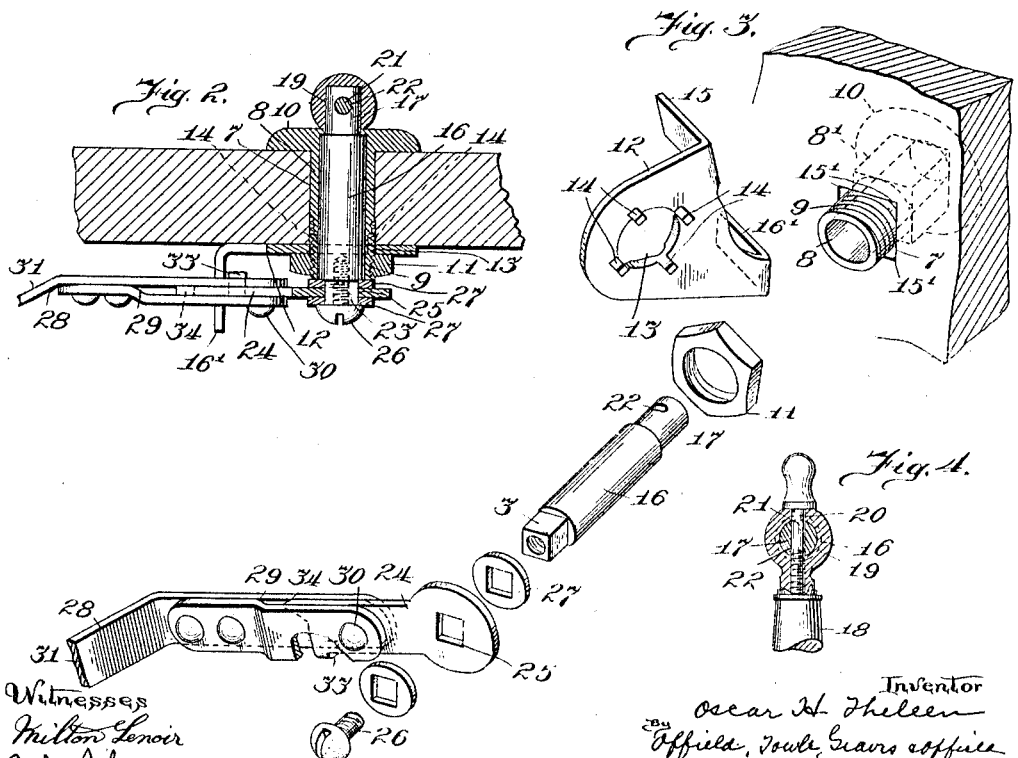

UNITED STATES PATENT OFFICE.

OSCAR H. THELEEN, OF KENOSHA, WISCONSIN, ASSIGNOR TO THE FROST MANUFACTURING CO., OF KENOSHA, WISCONSIN, A CORPORATION OF WISCONSIN.

VALVE-OPERATING MECHANISM.

1,066,863.   Specification of Letters Patent.   Patented July 8, 1913.

Application filed December 20, 1910. Serial No. 598,408.

*To all whom it may concern:*

Be it known that I, OSCAR H. THELEEN, residing at Kenosha, in the county of Kenosha and State of Wisconsin, have invented certain new and useful Improvements in Valve-Operating Mechanisms, of which the following is a specification.

My invention relates to improvements in valve operating mechanisms, and particularly to such valve operating mechanisms which are adaptable for use with flushing tanks and which comprise leverage mechanism to be arranged within the tank and controlling mechanism which is arranged at the outside of the tank.

The important objects of the invention are to provide more simplified and more efficient construction and arrangement and a construction which is devoid of any delicate or complicated parts and which is, therefore, less expensive to manufacture, yet which will enable the mechanism to be adjustable and adaptable in various ways with various forms or kinds of tanks.

The invention is illustrated in the accompanying drawings, in which—

Figure 1 is a sectional view through a tank showing an inner wall of the latter to which the invention is applied, Fig. 2 is a fragmentary horizontal sectional view, Fig. 3 is a perspective view showing the various parts of the operating mechanism separated in order to more clearly bring out the details of construction, and Fig. 4 is a sectional detail showing the manner of securing the handle to the operating shaft.

In the drawings 1 designates a flushing tank which may be of any suitable construction and to the wall 2 of which is secured the valve operating mechanism which is the subject of my invention. The floor of the tank is provided with a suitable outlet 3 controlled by a float valve 4 carried on a valve stem 5. The side wall 2 of the tank is provided with an aperture 7 through which extends a sleeve or bushing 8, the inner end of which is screw threaded as shown at 9 to receive a lock nut 11. The other end of the sleeve is provided with an annular escutcheon head or flange 10 which lies flush with the outer face of the tank. In many cases the aperture 7 may be round and the sleeve 8 correspondingly round, but in some cases the aperture is polygonal, and the sleeve should then be correspondingly shaped. As shown at 8' in Fig. 3, the aperture 7 is square to receive the squared sleeve 8', this polygonal shape serving to prevent rotation of the sleeve within the aperture. Between the nut 11 and the inner face of the wall 2, an abutment bracket 12 is clamped, this bracket being apertured as shown at 13 to fit over the threaded end of the sleeve. Adjacent the aperture 13 the bracket is provided with studs 14, and where the aperture is square, as shown in Fig. 3, these studs extend into the corners 15' to thus securely lock the bracket against rotation when clamped against the wall 2. Where the aperture 7 is round the edge thereof can be readily notched to receive the studs.

Within the sleeve 8 is rotatably mounted an operating shaft 16 preferably provided at its outer end with a reduced extension 17 which projects through the head 10 to receive the handle 18. The attached end of the handle is provided with a socket 19 which fits over the end 17 and is also provided with an axial bore 20 intersecting the socket 19 and threaded below the socket to receive the screw key 21, as best shown in Fig. 4. This key securely and rigidly locks the handle to the shaft, and its head is formed to resemble a continuation of the handle and to wholly conceal the securing means between the handle and shaft.

The inner end of the shaft 16 is provided with a reduced extension 23 upon which is mounted an operating arm or lever 24, the aperture 25 in this arm receiving the extension 23, and the arm may be secured to the extension in any suitable manner. As shown, the extension and aperture are squared and the extension is axially threaded to receive a screw 26, washers 27 being applied to the extension at either side and to the arm. To the arm 24 at an intermediate point thereof is pivoted the valve operating lever 28, the inner end of this lever being bifurcated, as shown at 29, and the two ends being pivotally secured to the arm 24 by means of a stud 30. The free end of the lever 28 is bent outwardly, as shown at 31, and at its end pivotally receives the valve stem 5, as indicated at 32.

Above and below the arm 24 the bracket 12 is provided with abutment lugs or fingers 15 and 16', these lugs limiting the swing of the arm, the uppermost position of the arm being limited by the engagement thereof with the upper pin 15, and the lowermost position being limited by the engagement with the lower abutment 16′ of the extension 34 at the end of the arm and at the upper corner thereof, so that the greater part of the arm will have passed beyond the abutment 16′ when the extension 34 engages with this abutment. The end of the arm 24 at its lower corner has an internal lug 33 which engages the lower edge of the lever 28 when the lever is parallel with the arm.

The operation is now apparent. In the normal position of the parts the handle 18 hangs in vertical position, and the lever 28 and arm 24 are parallel, the lever resting against the lower abutment 16′, and the valve being seated to conceal the tank. Upon swing of the handle away from its neutral position and to the position indicated by *a*, Fig. 1, the arm 24 will be swung farther downwardly until its extension 34 engages the lower abutment 16′. The lever 28, however, will swing upwardly about its pivot 30, the lower abutment 16′ acting as a fulcrum, and the valve stem will be raised and the valve unseated to allow the contents of the tank to escape. After such escape of the contents the parts by force of gravity return to their neutral positions, and the valve will again become seated. If the handle is swung in the opposite direction to the position indicated by *b* in Fig. 1, the arm 24 will be swung upwardly, and by virtue of the engagement of the lug 33 with the lever 28 this lever will remain parallel with the arm and will be carried bodily therewith until the arm strikes the upper abutment 15, and the valve stem will be again raised to unseat the valve, and upon escape of the contents of the tank the parts will again fall back to their normal or neutral position indicated by the full lines in Fig. 1. Thus upon swing of the handle in either direction from its neutral position the lever 28 will be carried upwardly to cause unseating of the valve, and after the escape of the tank contents the parts will automatically assume their neutral positions to cause re-seating of the valve. The studs 14 on the abutment bracket 12 will rigidly lock the bracket to the wall 2, and the adjustment of its abutment studs 15 and 16′ will therefore remain permanent with reference to the arm 24 and lever 28. Accuracy in seating the valve is therefore always maintained and assured.

Changes and modifications are of course possible which would still come within the scope of the invention, and I do not therefore desire to be limited to the precise construction and arrangement shown, and

I claim the following:

In lever mechanism, the combination of a plate adapted to be rigidly secured to a support and having upper and lower abutment extensions, a lever pivoted at its inner end with reference to said plate and to one side of the abutments thereon and extending outwardly between said abutments, said lever being jointed at the point between its pivot and the lower abutment, an actuating member engaging with the lever at its pivot end, the short inner section of said lever having an abutment for receiving the lower edge of the outer section whereby upon movement of said actuating member in one direction said lever will be swung upwardly as a whole about its pivoted end, said upper abutment serving to limit the upper swing of the lever as a whole, the short inner end of said lever being adapted upon downward swing thereof by the actuating member to pass within said lower abutment whereby the outer section of the lever will in striking said lower abutment be deflected upwardly about the lever joint, and an extension on said short section of the lever for engaging with said lower abutment after a distance of downward swing of said section whereby the downward movement of said section is limited.

In witness whereof, I hereunto subscribe my name this 16 day of December, A. D., 1910.

OSCAR H. THELEEN.

Witnesses:
 WENDELIN FONK,
 CORA M. VAN LIERE.